United States Patent [19]
Webb

[11] Patent Number: 6,118,580
[45] Date of Patent: *Sep. 12, 2000

[54] CONFOCAL SCANNING MICROSCOPE WITH ANGLED OBJECTIVE LENSES FOR IMPROVED AXIAL RESOLUTION

[75] Inventor: Robert H. Webb, Lincoln, Mass.

[73] Assignee: The General Hospital Corporation, Boston, Mass.

[*] Notice: This patent is subject to a terminal disclaimer.

[21] Appl. No.: 09/395,589

[22] Filed: Sep. 14, 1999

Related U.S. Application Data

[63] Continuation of application No. 08/866,732, May 30, 1997, Pat. No. 5,973,828.

[51] Int. Cl.⁷ .................................................. G02B 21/06
[52] U.S. Cl. .......................................... 359/385; 359/368
[58] Field of Search ...................................... 359/368–369, 359/385–390, 204–210; 250/201.2, 201.3, 234

[56] References Cited

U.S. PATENT DOCUMENTS

| | | | |
|---|---|---|---|
| 4,170,398 | 10/1979 | Koester | 359/368 |
| 4,768,873 | 9/1988 | Webb | 351/205 |
| 5,483,055 | 1/1996 | Thompson et al. | 250/201.03 |
| 5,691,839 | 11/1997 | Kobayashi | 359/368 |
| 5,760,951 | 6/1998 | Dixon et al. | 359/368 |
| 5,973,828 | 10/1999 | Webb | 359/385 |

OTHER PUBLICATIONS

Rajadhyaksha, et al. "In Vivo Confocal Scanning Laser Microscopy ——"J. Invest. Derm. 104.6:1–7, Jun. 1995.

Webb, "*Confocal optical microscopy,*" Rep. Prog. Phys. 59:427–471 (1996).

Koester, "Scanning mirror microscope with optical sectioning characteristics: applications in opthalmology,"Applied Optics 19:1749–1757 (1980).

Stelzer et al., "A new tool for the observation of embryos and other large specimens: confocal theta fluorescence microscopy,"J. Microscopy 179: 1–10 (1995).

*Primary Examiner*—Thong Nguyen
*Attorney, Agent, or Firm*—Kenneth J. Lukacher

[57] ABSTRACT

A confocal scanning microscope has an illuminating aperture and a detecting aperture whose optical axes intersect at an angle. Multiplication of a predominantly transverse section of the point spread function of one aperture with the predominantly axial section of the point spread function of the other aperture results in improved axial resolution to the extent that the transverse section is narrower than the axial section.

15 Claims, 8 Drawing Sheets

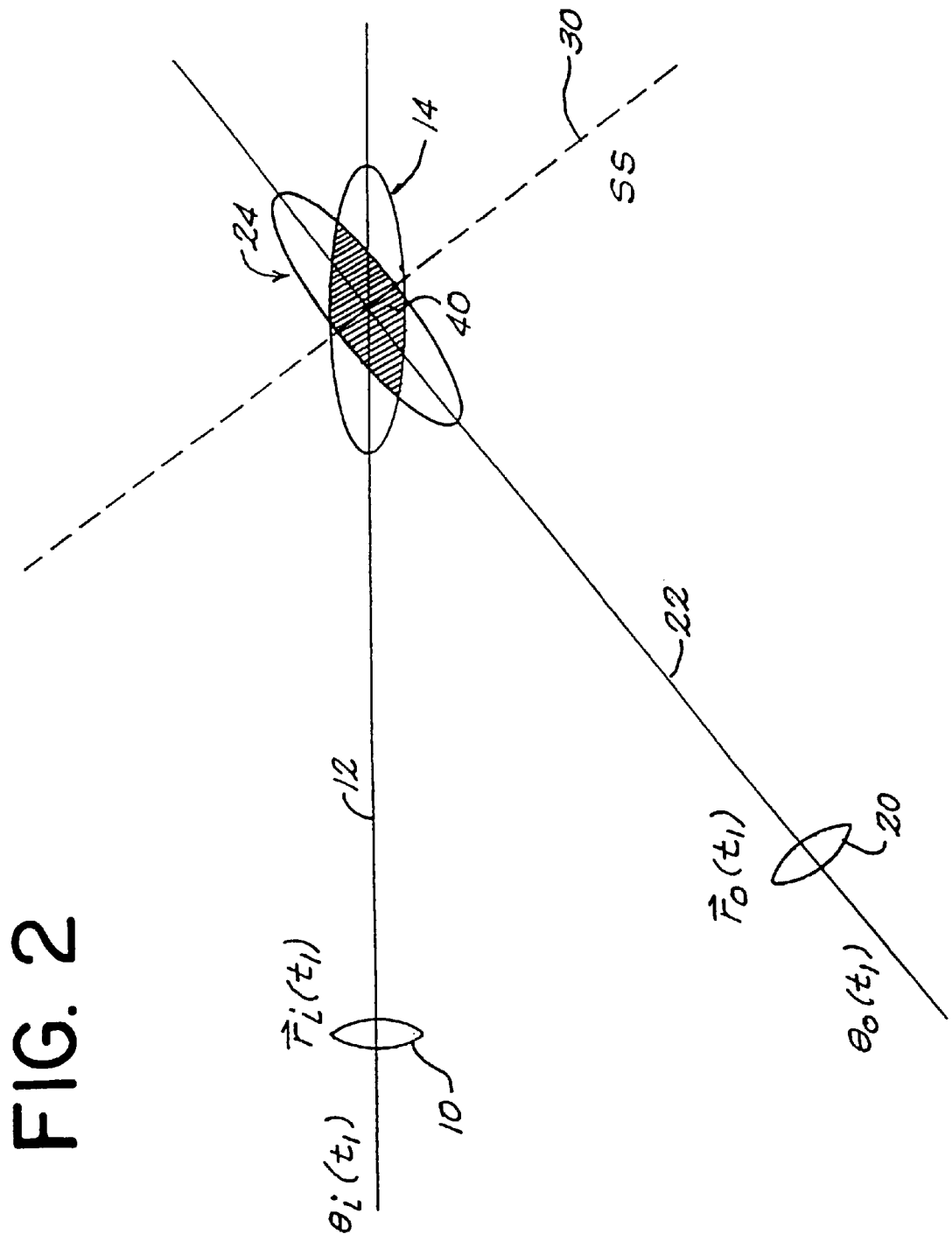

CONFOCAL SCANNING MICROSCOPE WITH ANGLED OBJECTIVE LENSES FOR IMPROVED AXIAL RESOLUTION

This is a continuation of patent application Ser. No. 08/866,732, filed May 30, 1997, now U.S. Pat. No. 5,973,828.

This invention relates to the field of confocal scanning microscopes and, in particular, to microscopes having separate objective lenses forming point-spread functions with different spatial orientations which combine to control the resolution of the microscope.

BACKGROUND

For each point in space, a microscope's resolving power is described by a function of three spatial variables called the point-spread function. The point-spread function is typically the Fourier Transform of an aperture distribution. Although the point-spread function is defined at all points in space, the region of most interest to microscopists is that region in which the point-spread function reaches its maximum value. This region is referred to as the "main lobe" of the point-spread function.

The overall shape of a point-spread function, and in particular the shape of the main lobe of a point-spread function, is determined by the microscope objective lens and the illumination source. The spatial location of the main lobe, however, is determined in part by the location of the lens in the three-dimensional space.

A point-spread function defines the resolution of a microscope because two luminous points in the field of view are resolvable only to the extent that their images can be separated by two main lobes from two different point-spread functions. Since the point-spread function is three dimensional, whether or not two luminous points are in separate main lobes depends on both how far apart they are and on the direction in which they are separated.

The transverse resolution of a microscope depends on the width of a cross section of the main lobe transverse to the optical axis. The images of two points in a plane transverse to the optical axis are resolvable if they are separated by a distance exceeding the width of the cross section. Similarly, the axial resolution of a microscope depends on the length of a cross section of the main lobe in a plane containing the optical axis. Images of two points in the plane containing the optical axis are resolvable to the extent they are separated by more than this length.

The point spread functions of the illuminating aperture and of the detecting aperture are formed by convolving the response of the lens to an infinitesimal point source (the lens's "impulse response") with a function representative of the spatial extent and intensity of the illumination source. In the ideal case, where the illumination source is an infinitesimal pinhole, the point-spread functions for both the illumination aperture and the detection aperture of a confocal microscope are sync functions in the axial direction and Bessel functions in the transverse direction. In the case of a pinhole having a finite aperture, the forms of the point spread functions are modified slightly as a result of the above-mentioned convolution.

While the forms of these functions depend on the geometry of the apertures and the spatial extent of the illuminating pinhole, the scales of these functions depend on the numerical apertures of the objective lenses. The axial extent of the main lobe is inversely proportional to the square of the numerical aperture whereas the transverse extent of the main lobe is inversely proportional to numerical aperture. Accordingly, the main lobe extends further in the axial direction than it does in the transverse direction. Because of this, the resolution in the axial direction is significantly poorer than the resolution in the transverse direction.

In conventional confocal microscopes, the overall point-spread function is the product of the point-spread functions for the illuminating aperture stop and for the detecting aperture stop. Since, as described above, these two point-spread functions are of the same form, the product of the two point-spread functions still has a main lobe which is long in the axial direction. The axial extent of the main lobe limits the axial resolution of the confocal microscope, thereby limiting the ability of the confocal microscope to perform optical sectioning on very thin layers.

Conventional methods of increasing axial resolution focus on using objective lenses with high numerical aperture. This is unattractive for several reasons. First, for applications requiring a wide field of view, the narrow field of a high numerical aperture lens is undesirable. Second, for certain applications such as the examination of images deep within tissue, the short focal length of a high numerical aperture lens makes it difficult to place the lens close enough to the region of interest for the microscope to function effectively. Third, for scanning which requires movement of the objective lens, the increased weight of a high numerical aperture lens limits the speed and precision with which the lens can be moved during scanning.

Accordingly, there exists a need for a confocal scanning microscope having enhanced axial resolution but without the constraints of short focal length, excessive weight and narrow field of view imposed by the use of a lens having a high numerical aperture.

SUMMARY OF THE INVENTION

The invention includes an apparatus and method for increasing the axial resolution of a confocal scanning microscope by spatially orienting both the illuminating aperture and the detecting aperture of the microscope in such a way that the optical axis of the illuminating aperture and the optical axis of the detecting aperture intersect at an angle. Because the overall point spread function for the microscope is determined by the product of the point spread functions of the illuminating and detecting apertures, and because the point spread functions for both the illuminating aperture and the detecting aperture typically lack spherical symmetry, the shape of the overall point spread function can be varied by varying the angle at which the main lobes of the point spread function intersect.

More specifically, the main lobes of the point spread functions of the illumination and detection apertures are typically eccentric ellipsoids with major axes coincident with their optical axes and minor axes much shorter than their major axes. Such main lobes have a narrow transverse section and a long axial section. If two such lobes are made to intersect at an angle, a predominantly transverse, and therefore narrow, section from one lobe will multiply a predominantly axial, and therefore long, section from the other lobe. This multiplication will result in the narrow, predominantly transverse section from one lobe "zeroing out" the long, predominantly axial section from the other lobe. The effect of the multiplication is therefore to reduce the length of the axial section of the overall point spread function, thereby increasing its resolution.

The confocal scanning microscope of the invention includes an optical element for focusing light traveling along a ray axis onto a target point on the object plane and another optical element for focusing light from the target point, along another ray axis, to a detection point. These two optical elements typically have optical axes that intersect at a variable angle.

Because the microscope must scan in order to form an image, the invention includes an apparatus and method for coordinating or synchronizing the movement of two optical elements so that the main lobes of their respective point spread functions intersect at the desired location at all target points on the path to be scanned. Because the optical axes of the two optical elements can meet at an arbitrary angle, the ability to coordinate the movement of the two optical elements in this manner is made more practicable by providing for movement with at least two degrees of freedom. In particular, the apparatus and the method for moving the target point, and hence the point spread functions, provide for movement of the point spread functions in a direction having a component transverse to the scan line as well as in a direction orthogonal to the scan line.

In one embodiment, the apparatus for providing the optical elements with movement having two degrees of freedom includes an element for pivoting the ray axis about the optical axis and then translating the optical element along the optical axis. In another embodiment, movement having two degrees of freedom can be provided by an element for moving the optical element along the optical axis as well as in a direction transverse to the optical axis.

The synchronization and coordination of the movement of the optical elements can be provided for in different ways. For example, in one embodiment this function is provided by one or more programmable controllers. In another embodiment, this function is provided by rigidly coupling the two optical elements so that they move in lockstep fashion.

In one embodiment, optical elements can be objective lenses having a low numerical aperture, such as 0.15. In another embodiment, the optical elements can be GRIN rods, which are optical waveguides having a prescribed radially varying index of refraction and which are therefore capable of focusing light.

BRIEF DESCRIPTION OF THE DRAWINGS

These and other features, aspects and advantages of the invention will be better understood with reference to the following description, the appended claims, and the accompanying drawings in which:

FIG. 2 depicts the main lobes of two point spread functions, each similar to that shown in FIG. 1A, intersecting along a scan line;

DESCRIPTION OF ILLUSTRATED EMBODIMENT

Figure 7:
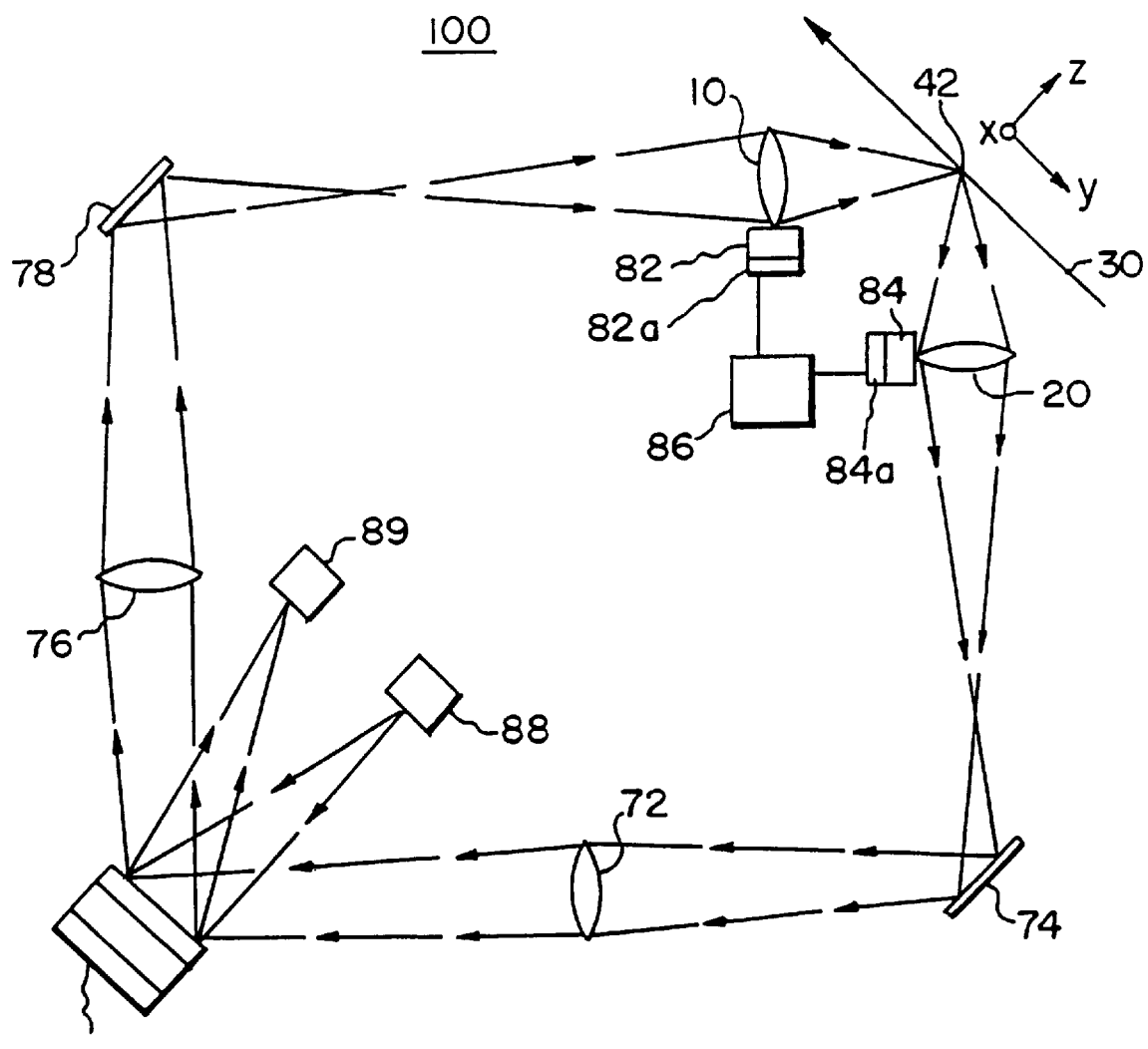
FIG. 7 is a diagrammatic representation of a confocal scanning microscope apparatus according to the invention for maintaining intersecting point spread functions during the slow scan phase as depicted in FIG. 3.

A schematic view of an illustrated embodiment of a confocal scanning microscope apparatus 100 embodying the invention is shown in FIG. 7. The apparatus 100 includes a rotating polygonal mirror 70 which directs light from a source 88, shown in FIG. 8A, to an illumination relay lens 76, shown in both FIG. 8A and FIG. 7. An illumination turning mirror 78 disposed in the optical path of the illumination relay lens 76 directs the incident light to an illumination objective lens 10. The illumination objective lens 10 is mounted on a first flexure mount 82 which permits translation of the illumination lens. The apparatus further includes a detection objective lens 20 similarly mounted on a second flexure mount 84 which permits translation of the detection objective lens.

A controller 86 controls the translation of the illumination objective lens 10 by controlling the first flexure mount 82 through a first flexure mount controller interface 82a. Similarly, the controller 86 controls the translation of the detection objective lens 20 by controlling the second flexure mount 84 through a second flexure mount controller interface 84a.

Figure 8C:
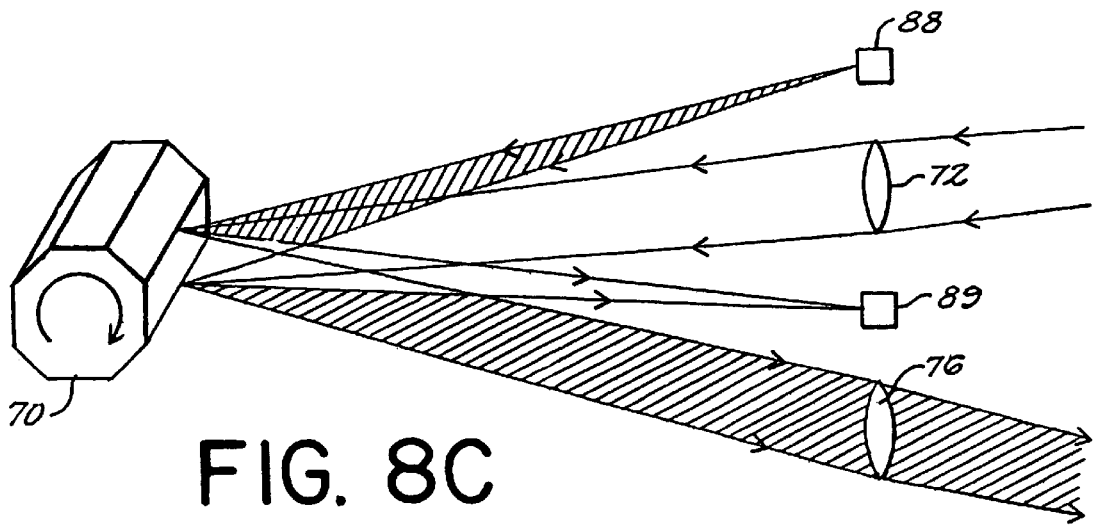
FIG. 8C shows a perspective view of the rotating polygonal mirror of FIGS. 8A and 8B in which both relay lenses, the source and the detector are all visible.
Figure 8A:
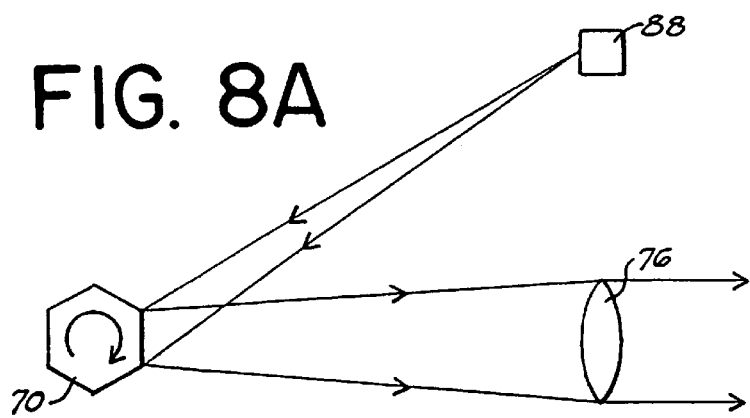
FIG. 8A shows an elevation view of the apparatus in FIG. 7 illustrating the use of a rotating polygon to implement the fast scan phase.
Figure 8B:
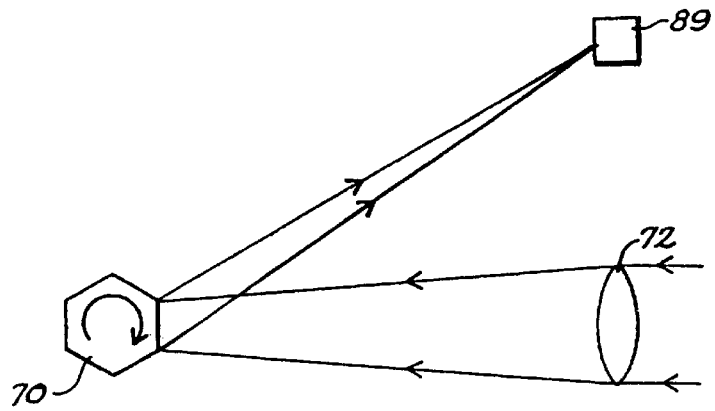
FIG. 8B shows an elevation view of the apparatus of FIG. 7 but from a direction showing the detection relay lens instead of the illumination relay lens.

A detection turning mirror 74 in the optical path of the detection objective lens 20 directs returning light to a detection relay lens 72 shown in both FIG. 7 and FIG. 8B. The rotating polygonal mirror 70 in the optical path of the detection relay lens 72 then directs light from that lens to a detector 89 as shown in FIG. 8B.

In operation, a beam of light from the source 88 falls on the rotating polygonal mirror 70 which then directs it to the illumination objective lens 10 by way of the illumination relay lens 76 and the illumination turning mirror 78. The illumination objective lens 10 focuses this incident light on a target point 42 located on a scan line 30. Returning light from the target point 42 is captured by the detection objective lens 20 and returned to the polygonal mirror 70 by way of the detection turning mirror 74 and the detection relay lens 72. The rotating mirror 70 then directs the returning light to a detector 89.

Rotation of the polygonal mirror 70, shown in isometric view in FIG. 8C, permits light incident on the target point 42 to be scanned in the x direction. This direction is referred to as the "fast scan" direction. Movement of the illumination objective lens 10 by means of the flexure mount 82 permits light incident on the target point 42 to be scanned in the y direction along the scan line 30. This direction is referred to as the "slow scan" direction. The combination of the fast scan provided by the rotating polygonal mirror 70 and the slow scan provided by the movement of the objective lens 10 by means of the flexure mount 82 enables the apparatus to illuminate a plane orthogonal to the xz plane.

Figure 6:
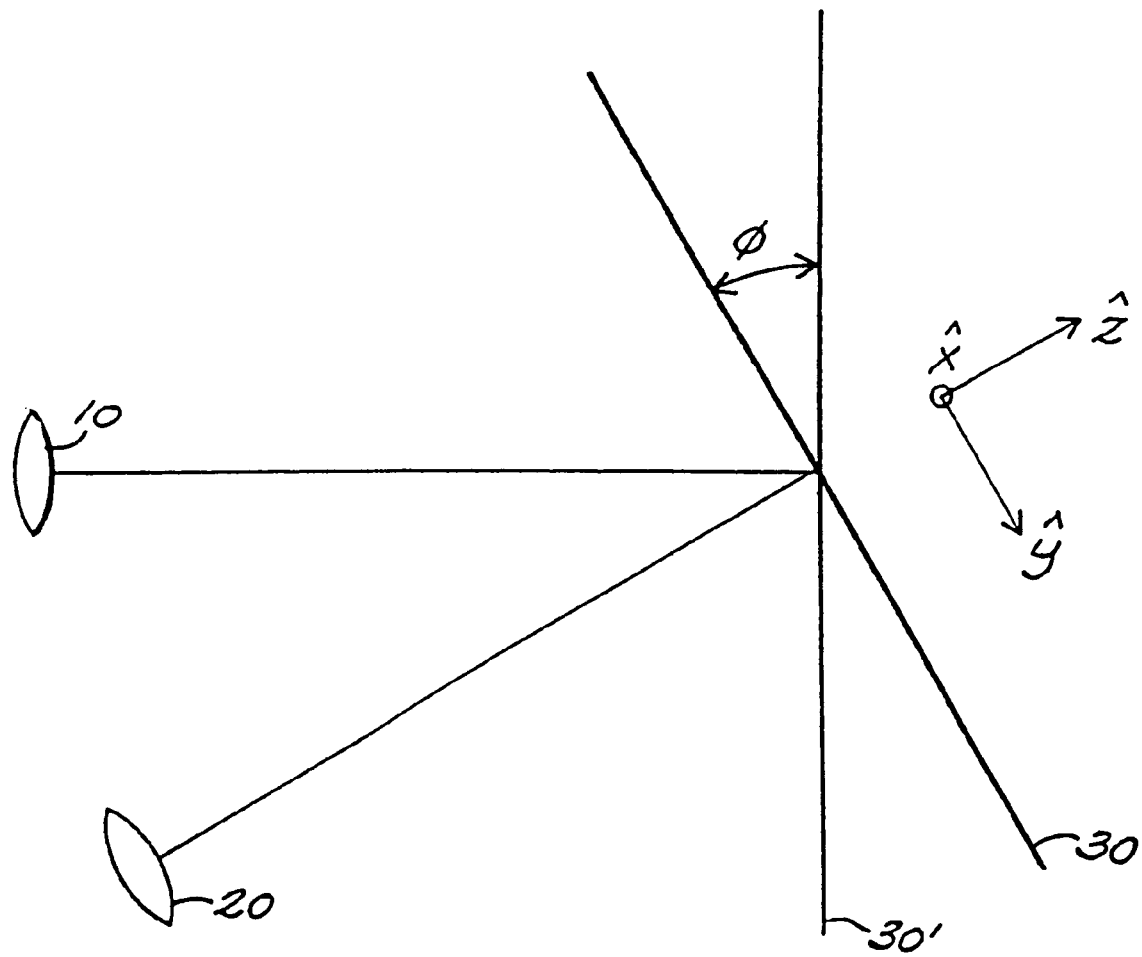
FIG. 6 illustrates how the method depicted in FIGS. 4 and 5 can scan along a scan line having an arbitrary slope in the yz plane.

The scan line 30 shown in FIG. 7 can be rotated around the x axis to form a new scan line 30' as shown in FIG. 6. This is performed by appropriately moving the objective lens 10 by means of the flexure mount 82. It is apparent from FIG. 6 that an apparatus embodying the invention can scan any plane orthogonal to the xy plane.

The detection objective lens 20 must be moved in a manner coordinated with the movement of the illumination objective lens 10. Specifically, the focus of the detection objective lens must at all times be coincident with the focus of the illumination objective lens 10. In the fast scan direction, this coordination is provided by the rotating polygonal mirror 70 which scans the illuminating beam and the detection beam in the z direction simultaneously. In the slow scan direction, coordination between the motion of the illuminating objective lens 10 and the motion of the detection objective lens 20 is provided by the controller 86 which is in communication with both the first flexure mount 82 and the second flexure mount 84.

Referring to FIG. 2, the apparatus of the invention increases the axial resolution of a confocal microscope by multiplying the point spread function of the illuminating objective lens 10 with the point spread function of a detection objective lens 20 having an optical axis 22 which intersects the optical axis 12 of the illuminating objective lens 10 at an angle.

Figure 1A:
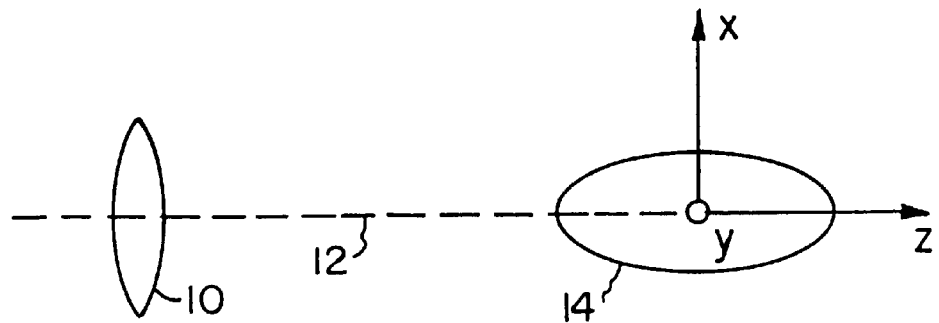
FIG. 1A shows the ellipsoidal main lobe of a point spread function.
Figure 1B:
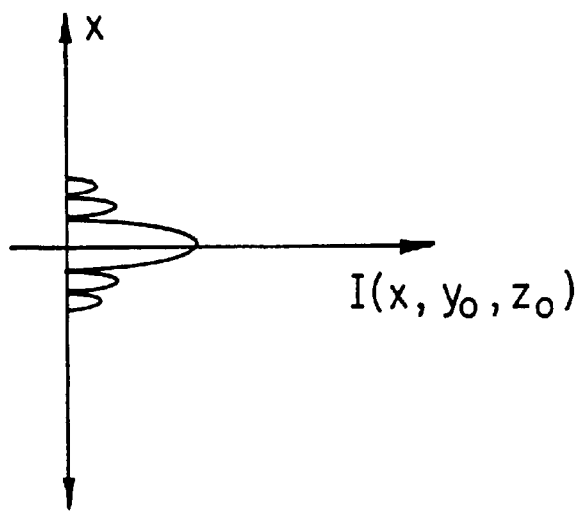
FIG. 1B shows a transverse cross section of the main lobe shown in FIG. 1A.
Figure 1C:
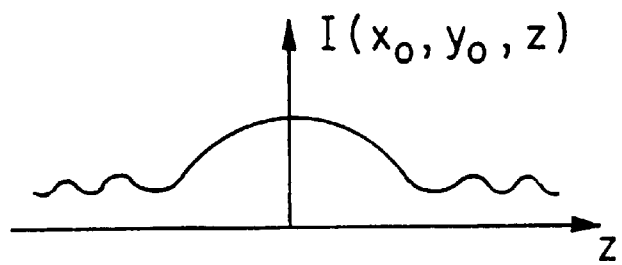
FIG. 1C shows an axial cross section of the main lobe shown in FIG. 1A.

FIG. 1A illustrates a main lobe 14 typical of an illuminating objective lens 10 illuminated by an aperture. By "main lobe" we mean that volume of three-dimensional space in which the magnitude of the point spread function exceeds a threshold. In most cases, the main lobe 14 is approximately ellipsoidal with a major axis collinear with the optical axis 12 of the lens 10. The eccentricity of this ellipsoid 14 is responsible for the difference between the lateral resolution and the axial resolution of the lens 10. FIG. 1B shows a transverse cut in which the point spread function is of the form sin (x)\x. FIG. 1C shows an axial cut in which the point spread function 14 is typically a Bessel function. It can be appreciated by those skilled in the art that the detection objective lens 20 has a point spread function having a main lobe, transverse and axial cuts similar to those shown in FIGS. 1A–1C.

In conventional confocal scanning microscopes, the optical axis 12 of the illuminating objective 12 is parallel to the optical axis 22 of the detection objective 20. Accordingly, the overall point spread of the system, which is the product of the point spread function 14 of the illuminating objective lens 10 with the point spread function 24 of the detection objective lens 20, is likewise an ellipsoid. This ellipsoid has an eccentricity substantially similar to the eccentricities of the ellipsoids forming the main lobes of the illuminating point spread function 14 and the detection point spread function 24. This results in little, if any, improvement in axial resolution.

In contrast, the apparatus of the invention includes a detection objective lens 20 having an optical axis 22 which intersects the optical axis 12 of the illuminating objective lens 10 at an angle as shown in FIG. 2. This results in the point spread function 14 of the illumination objective lens 10 intersecting the point spread function 24 of the detecting objective lens 20 at an angle. The two point spread functions, therefore form an overlapping volume 40. This overlapping volume 40 represents the main lobe of the overall point spread function for the combination of the illumination objective lens 10 and the detection objective 20. It is apparent, from inspection of FIG. 2, that this overlapping volume 40 is approximately ellipsoidal with a major axis shorter than the major axis associated with either the point spread function of the illumination objective lens 10 or the point spread function 24 of the detection objective lens 20. The synergistic combination of the two point spread functions results in an overall point spread function having an axial resolution greater than the axial resolution of either the illumination objective lens 10 or of the detection objective lens 20 by itself.

The formation of a complete image with the apparatus requires that the target point 42 be scanned in both a slow scan direction, along the scan line 30, and in a fast scan direction, orthogonal to the yz plane. Scanning in the fast scan direction is provided by a rotating polygonal mirror 70 which scans both the beam originating at the source and the beam originating at the target point simultaneously. Accordingly, in the fast scan direction, the main lobes of the two point spread functions maintain the same relative position at all times. In the slow scan direction, however, the main lobes of the two point spread functions can separate unless the illumination objective lens 10 and the detection objective lens 20 are translated in a coordinated manner.

FIG. 2 represents a snapshot of the apparatus at time $t_1$. The illumination beam is incident from an angle $\theta_i(t_1)$ and the illumination objective lens 10 is located at the position vector $r_i(t_1)$. The detection objective, located at the position vector $r_o(t_1)$, directs the returning light at an angle $\theta_o(t_1)$. The angle of incidence $\theta_i(t_1)$, and the position of the illumination objective 10, $r_i(t_1)$, are chosen so that rays of incident light from the illumination lens 10 focus on a target point 42 on a scan line 30. The position of the detection objective, $r_o(t_1)$, and the direction of the returning beam $\theta_o(t_1)$ are chosen so that rays of returning light originate from the same target point 42. This assures that the main lobe 14 of the of the point spread function for the illumination objective lens 10 and the main lobe 24 of the point spread function for the detection objective lens 20 form an overlapping volume 40 containing the maxima of the detection point spread function 24 and the illumination point spread function 14.

Figure 3:
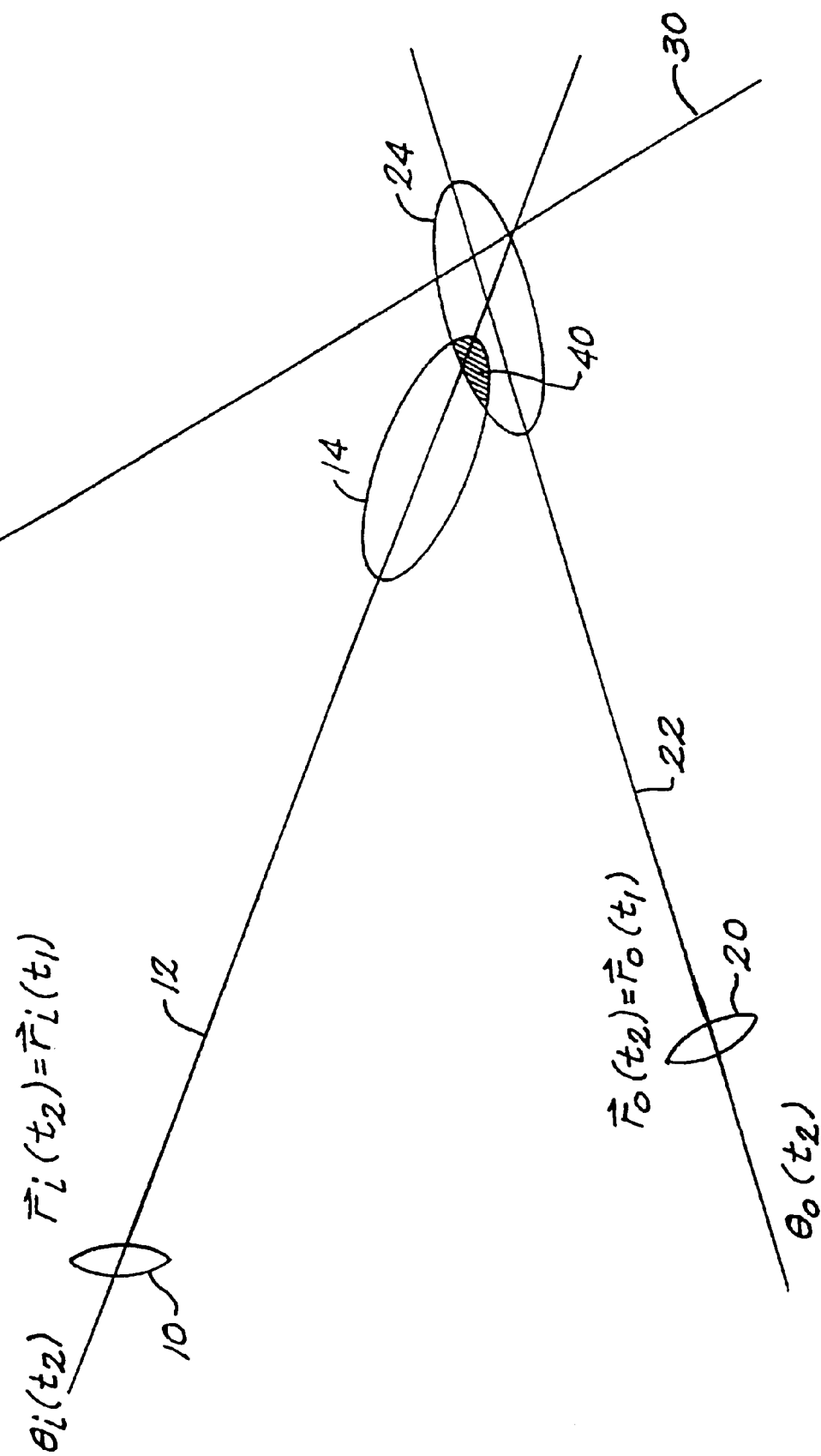
FIG. 3 depicts the failure of the main lobes of the two point spread functions of FIG. 2 to overlap when the target point moves along the scan line by pivoting only.

The configuration shown in FIG. 2 provides enhanced axial resolution only when the target point 42 has the y and z coordinates shown. For target points having other y and z coordinates, the main lobes of the illumination and detection point spread functions tend to diverge as shown in FIG. 3. Thus, in order to scan the target 42 along the scan line 30, this tendency for the illumination point spread function 14 and the detection point spread function 24 to diverge must be corrected. This requires that the illumination objective lens 10 and the detection objective lens 20 be translated in at least one direction.

FIG. 3 illustrates graphically why translation of the objective lenses can maintain the correct spatial relationship between the illumination point spread function 14 and detection point spread function 24. FIG. 3 shows a snapshot of the apparatus of FIG. 2 at a later time $t_2$ in which the angle of illumination $\theta_i(t_2)$ and the angle of detection $\theta_o(t_2)$ have been changed in an effort to scan the target point across the scan line 30. It is apparent from an inspection of FIG. 3 that the overlap volume 40 of the illumination point spread function 14 and the detection point spread function 24 is no longer located where the two point spread functions have their maxima. It is also apparent from FIG. 3 that there exists no combination of $\theta_i(t_2)$ and $\theta_o(t_2)$ which causes the illumination main lobe 14 and the detection main lobe 24 to overlap at a target point other than the target point shown in FIG. 2. To accomplish this result, it is necessary to either alter the focal lengths of the illumination objective lens objective lens 10 and the detection objective lens 20 or physically translate these two lenses.

Figure 4:
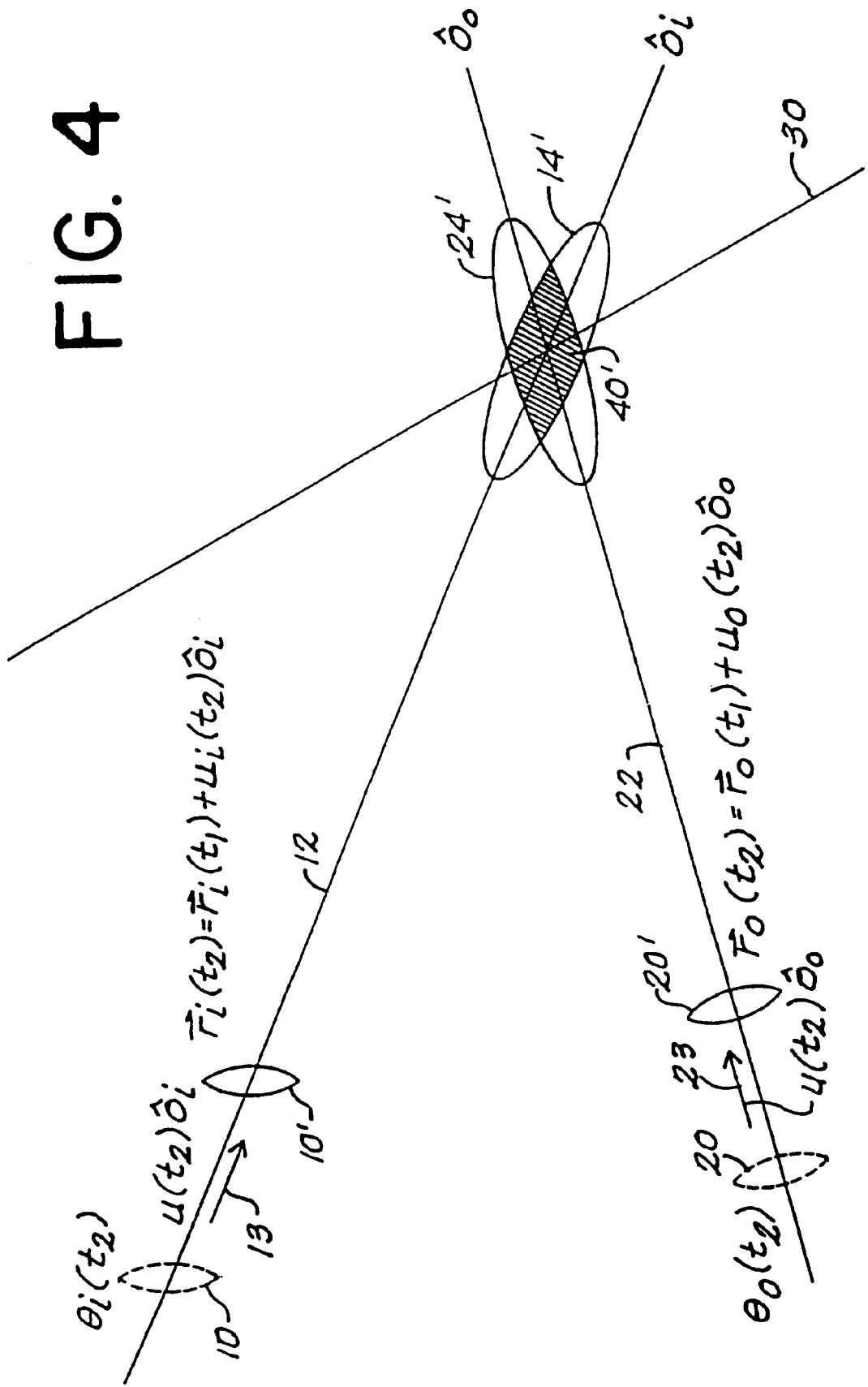
FIG. 4 depicts how the non-overlapping main lobes shown in FIG. 3, can be made to overlap by appropriate translation of the lenses in addition to pivoting the light source.

By providing a means to physically translate the illumination objective lens 10 and the detection objective lens 20, as shown in FIG. 4, the tendency of the illumination main lobe 14 and the detection main lobe 24 to separate can be corrected.

FIG. 4 shows a snapshot of a system at a later time $t_2$ in which the angle of illumination $\theta_o(t_2)$ and the angle of detection $\theta_o(t_2)$ have been changed. To prevent the illumination main lobe 14 and the detection main lobe 24 from diverging as they did in FIG. 3, the illumination objective lens 10 is translated along its optical axis 12 to a new location 10' by means of the flexure mount 82. This advances the illumination main lobe to a new position 14' in which its maximum is on the scan line 30. Similarly, the detection objective lens 20 is translated along its optical axis 22 by its flexure mount 84 to a new location 20'. This advances the detection main lobe 24 to a new position 24' in which its maximum is also on the scan line. This results in the detection main lobe 24' and the illumination main lobe 14' overlapping in a volume 40' shown in FIG. 3.

Figure 5:
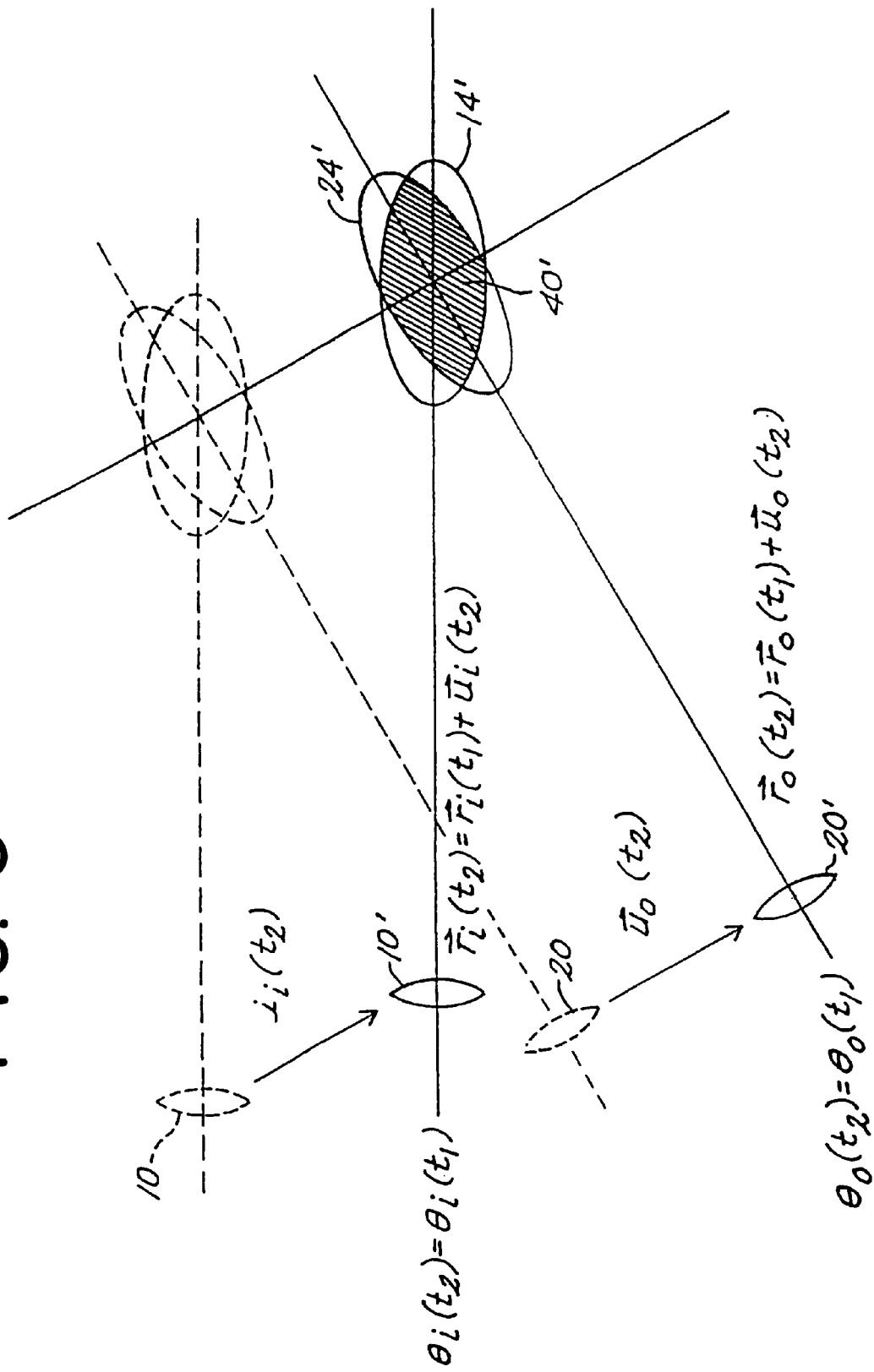
FIG. 5 shows how the result depicted in FIG. 4 can be achieved without a pivoting light source by using two translating lenses, each with two degrees of freedom.

In order to maintain the relative positions of the main lobes of the illumination and the detection lens, each main lobe must be able to move with two degrees of freedom in the yz plane. In the apparatus shown in FIG. 4, two degrees of freedom are provided by changing the angle of incidence $\theta_i$ and the angle of detection $\theta_o$ and permitting each objective lens to translate along its optical axis. The two degrees of freedom are therefore provided by a combination of pivoting and translation. However, the same two degrees of freedom can be provided in other ways. For example, in FIG. 5, the apparatus has flexure mounts such that the objective lenses are no longer constrained to move along their optical axes. Instead, they are free to move in any direction in the yz plane. FIG. 5 shows the illumination objective lens 10 shifted in the direction of vector $r_i(t_2)$ to a new position 10'. This results in the movement of the main lobe of the illumination point spread function to a new location 14'. Similarly, the detection objective lens 20 is shifted in the direction of the vector $r_o(t_2)$ to a new location 20'. This results in movement of the main lobe of the detection point spread function to a new location 24' having its maximum on the scan line 30. As a result, the main lobe of the illumination point spread function 14' and the main lobe of the detection point spread function 24' overlap to form an overlapping volume 14' centered on the scan line 30.

Having described the invention and several embodiments thereof, what is claimed as new and secured by Letters Patent is:

1. A system for forming an image on a detector of a target which is illuminated with focused light comprising:
   an optical element;
   a detector for receiving light from said target at at least one point through said optical element in which said optical element is at a position which enables imaging of said target at said detector by forming an overlap at said point with the light focused to said target; and
   means for moving said optical element in accordance with any change in position of the light focused at said target to maintain said overlap.

2. The system according to claim 1 wherein said detector is part of a confocal microscope.

3. A method for forming an image on a detector of a target which is illuminated with focused light comprising the steps of:
   providing an optical element;
   receiving light on the detector from said target at at least one point through said optical element;
   imaging of said target at said detector with the aid of said optical element in which said optical element is at a position which generates an overlap at said point with the light focused to said target; and
   moving said optical element in accordance with any change in position of the light focused at said target to maintain said overlap.

4. The method according to claim 3 wherein said detector is part of a confocal microscope.

5. A system for imaging a target comprising:
   a first optical element for focusing light to said target at at least one first point;
   first means for moving said first optical element to move said focused light with respect to said target;
   a second optical element;
   a detector for receiving light from said target at at least one second point through said second optical element, in which said second optical element enables imaging of said target at said detector by forming an overlap at said second point with said focused light from said first optical element at said first point; and
   second means for moving said second optical element synchronized with said first moving means to maintain said overlap and enable said detected light at said detector to form an image.

6. The system according to claim 5 further comprising:
   a light producing source; and
   means for scanning said light from said source to said first optical element.

7. The system according to claim 6 wherein said scanning means enables said detector to receive detected light from said target through said second optical element.

8. The system according to claim 5 wherein said first and second optical elements are spaced apart at an angle with respect to said target.

9. The system according to claim 5 wherein said detector is part of a confocal microscope.

10. The system according to claim 5 wherein at least one of said first and second optical elements represent objective lenses.

11. The system according to claim 5 wherein at least one of said first and second optical elements represent grin rods.

12. A microscope having enhanced axial resolution comprising:
   an illumination source;
   a first optical element for focusing light from said illumination source to a target point;
   a first means for moving said focused light;
   a second optical element for focusing light from said target point to a detection point;
   a second means synchronized with the movement of said first moving means for directing light from said target point to said detection point; and
   an output element for detecting said directed light at said detection point.

13. A method for enhancing the axial resolution in a microscope, said method comprising the steps of:

focusing light to a target point with a first optical element;

moving said target point along a first path;

focusing light from said target point to a detection point with a second optical element; and moving said detection point along a second path in synchrony with said moving of said target point along said first path.

14. A method for forming an image on a detector of a target which is illuminated with focused light comprising the steps of:

providing an optical element;

imaging said target at said detector through said optical element in which said optical element is at a position for receiving light from the target along an overlap with the light focused to said target; and moving the position of said optical element in accordance with any change in position of the light focused at said target to maintain said overlap.

15. A system for forming an image on a detector of a target which is illuminated with focused light comprising:

an optical element;

means for imaging said target at said detector through said optical element in which said optical element is at a position capable of receiving light from the target along an overlap with the light focused to said target; and means for moving said optical element in accordance with any change in position of the light focused at said target to maintain said overlap.

* * * * *